US008899254B1

(12) United States Patent
Weiler

(10) Patent No.: US 8,899,254 B1
(45) Date of Patent: Dec. 2, 2014

(54) VALVE REMOVAL TOOL AND METHOD

(71) Applicant: Donald Ray Weiler, Huntington Beach, CA (US)

(72) Inventor: Donald Ray Weiler, Huntington Beach, CA (US)

(73) Assignee: YamsMos & Company, Inc., Huntington Beach, CA (US)

( * ) Notice: Subject to any disclaimer, the term of this patent is extended or adjusted under 35 U.S.C. 154(b) by 0 days.

(21) Appl. No.: 13/799,878

(22) Filed: Mar. 13, 2013

Related U.S. Application Data

(60) Provisional application No. 61/690,071, filed on Jun. 19, 2012.

(51) Int. Cl.
*E03B 7/00* (2006.01)
*F16L 47/34* (2006.01)

(52) U.S. Cl.
CPC .................... *F16L 47/345* (2013.01)
USPC .............. 137/15.08; 137/315.41; 137/327; 29/426.5; 81/53.2

(58) Field of Classification Search
CPC .......... F16K 43/00; F16L 41/06; F16L 41/10; B25B 27/24
USPC .......... 137/15.08, 15.09, 15.18, 315.41, 318, 137/319, 327; 29/426.1, 426.5; 81/53.2
See application file for complete search history.

(56) References Cited

U.S. PATENT DOCUMENTS

| | | | | |
|---|---|---|---|---|
| 5,472,011 A * | 12/1995 | St. Marie | ................ | 137/315.18 |
| 5,893,686 A | 4/1999 | Weiler | | |
| 5,934,304 A * | 8/1999 | Peterson et al. | ........... | 137/15.03 |
| 6,253,436 B1 * | 7/2001 | Barjesteh et al. | ............ | 29/213.1 |
| 7,357,605 B2 | 4/2008 | Weiler | | |
| 2004/0000218 A1 * | 1/2004 | Bergamo | ....................... | 81/53.2 |
| 2006/0188349 A1 | 8/2006 | Weiler | | |
| 2007/0297867 A1 | 12/2007 | Weiler | | |
| 2009/0183603 A1 * | 7/2009 | Kozak et al. | ................... | 81/53.2 |
| 2009/0218532 A1 * | 9/2009 | Farrelly | ..................... | 251/149.6 |

* cited by examiner

*Primary Examiner* — Eric Keasel
*Assistant Examiner* — Reinaldo Sanchez-Medina
(74) *Attorney, Agent, or Firm* — Blakely Sokoloff Taylor & Zafman LLP

(57) ABSTRACT

Valve removal tool and method for removing older corporation valves/valves from pressurized lines such as water mains without depressurization. The removal tool is temporarily fastened to a saddle around the water main and includes a valve through which a tool may be inserted to grasp and unscrew the old valve and withdraw the old valve through the valve in the tool. The tool also allows placement of a plug in the opening in the water main left by the removal of the tool. Typically a cap is placed over the opening in the saddle to provide a final seal in the event the plug leaks or is somehow dislodged.

12 Claims, 11 Drawing Sheets

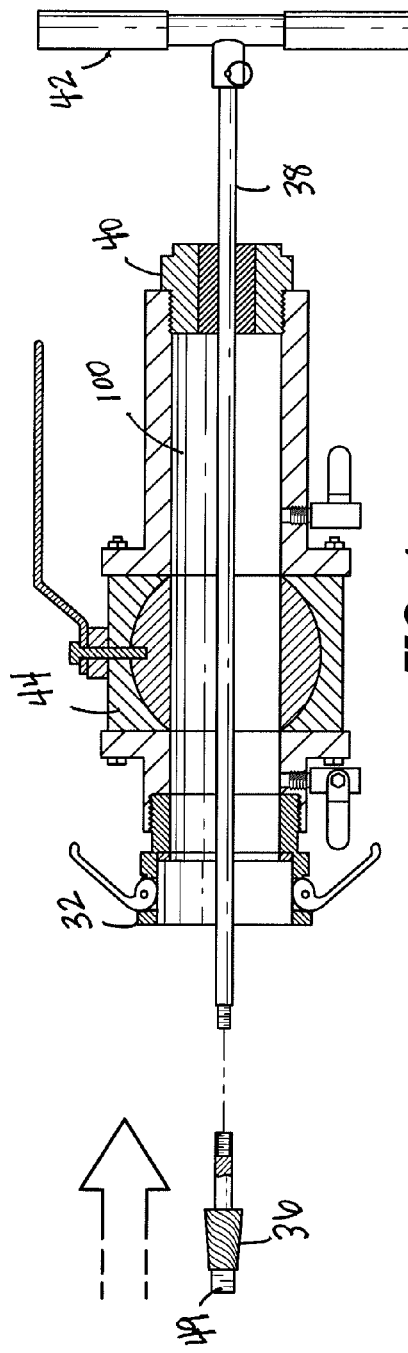
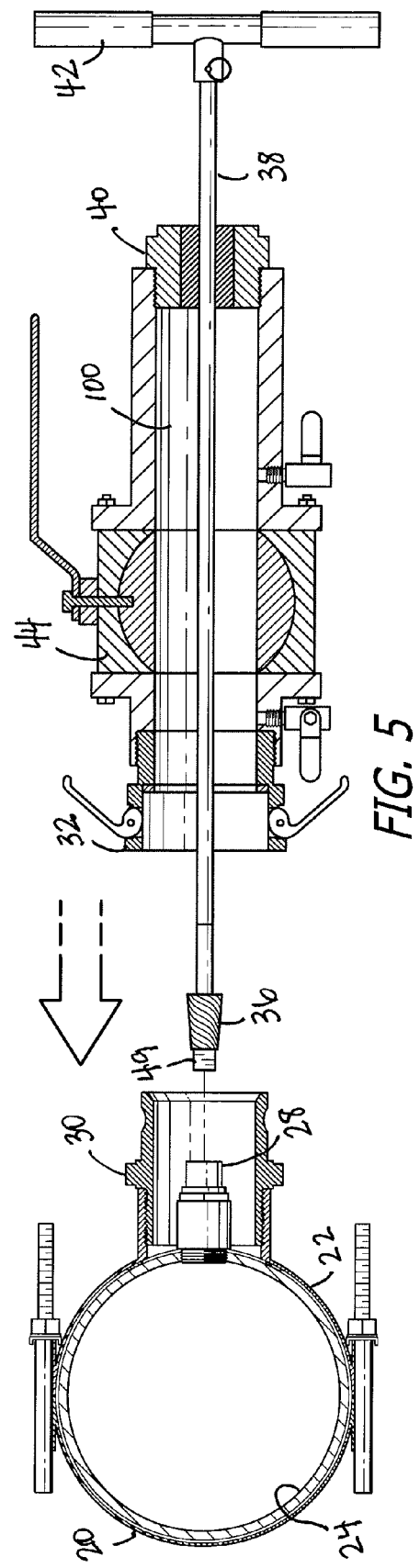
FIG. 4
FIG. 5

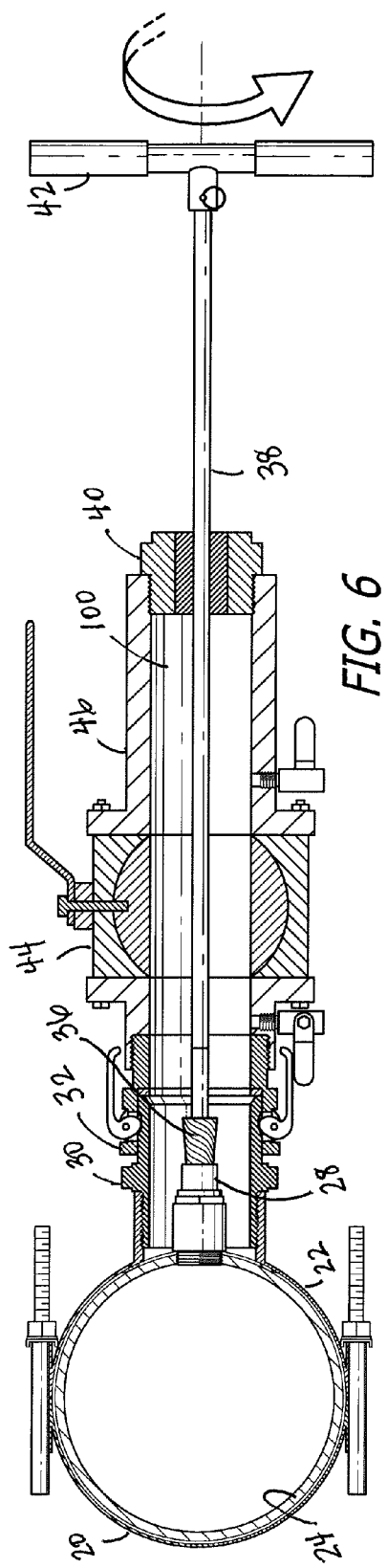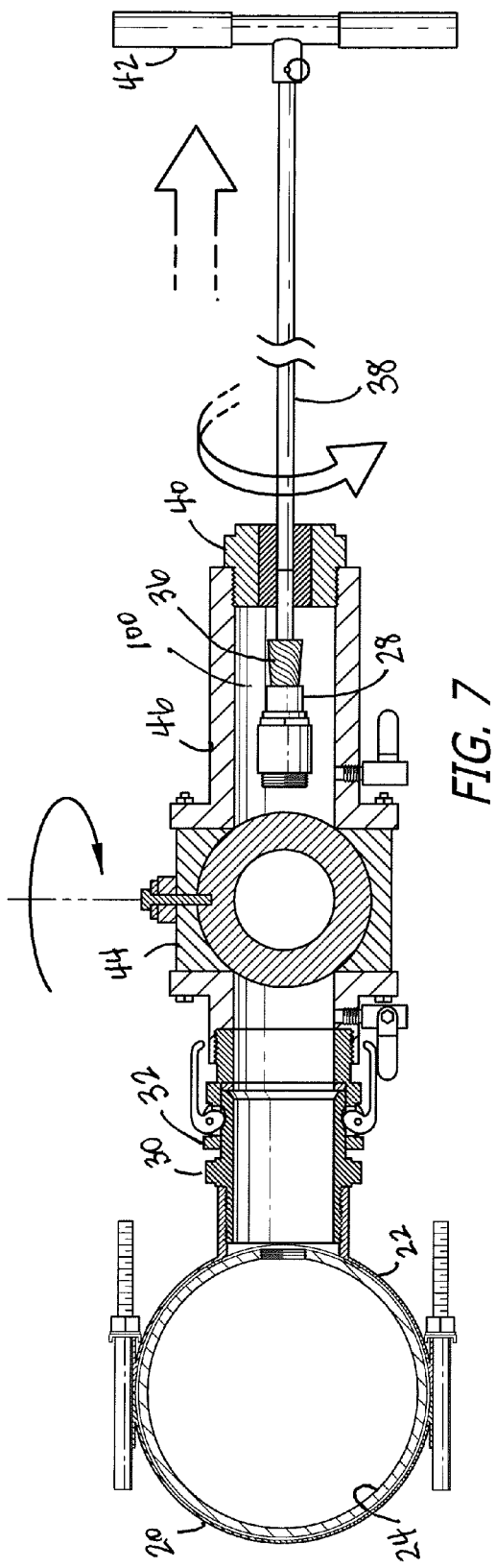

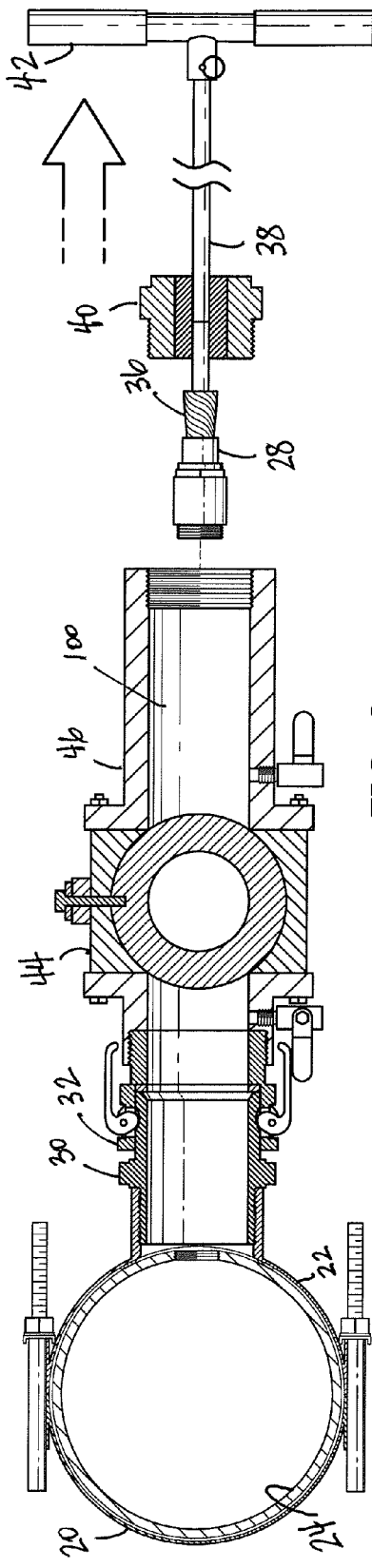
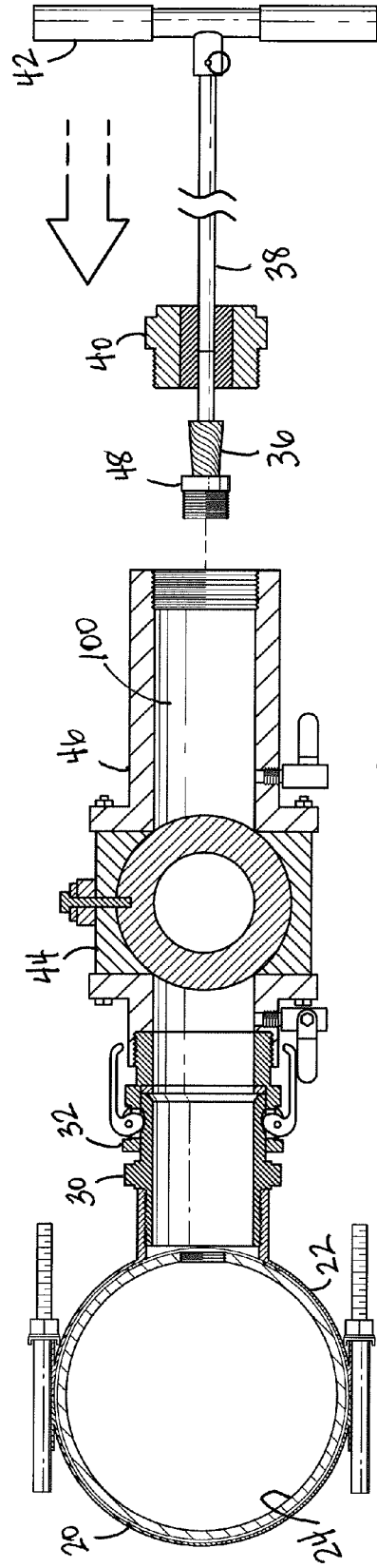
FIG. 8
FIG. 9

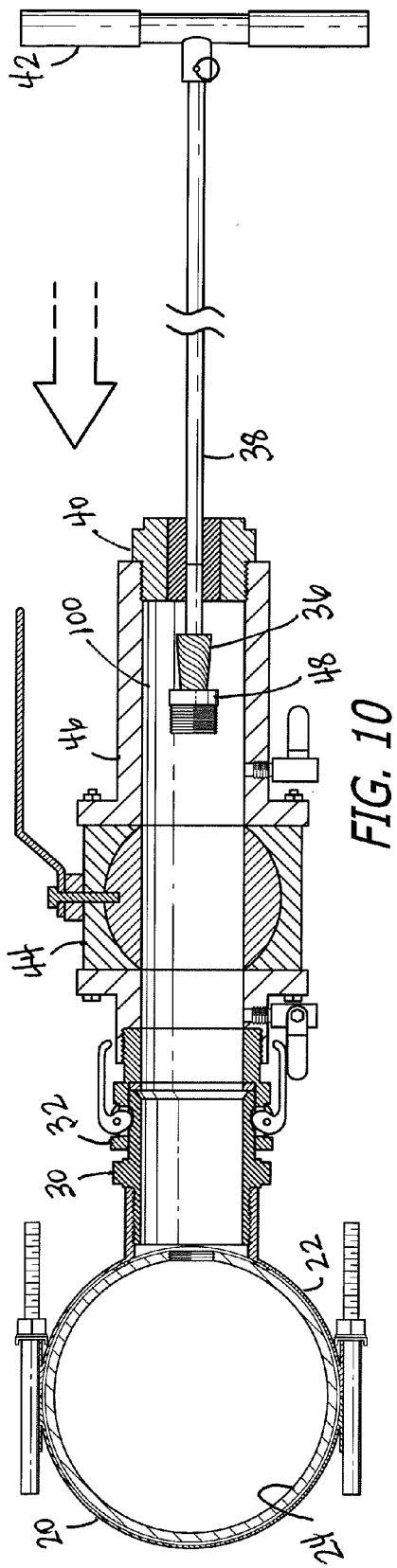
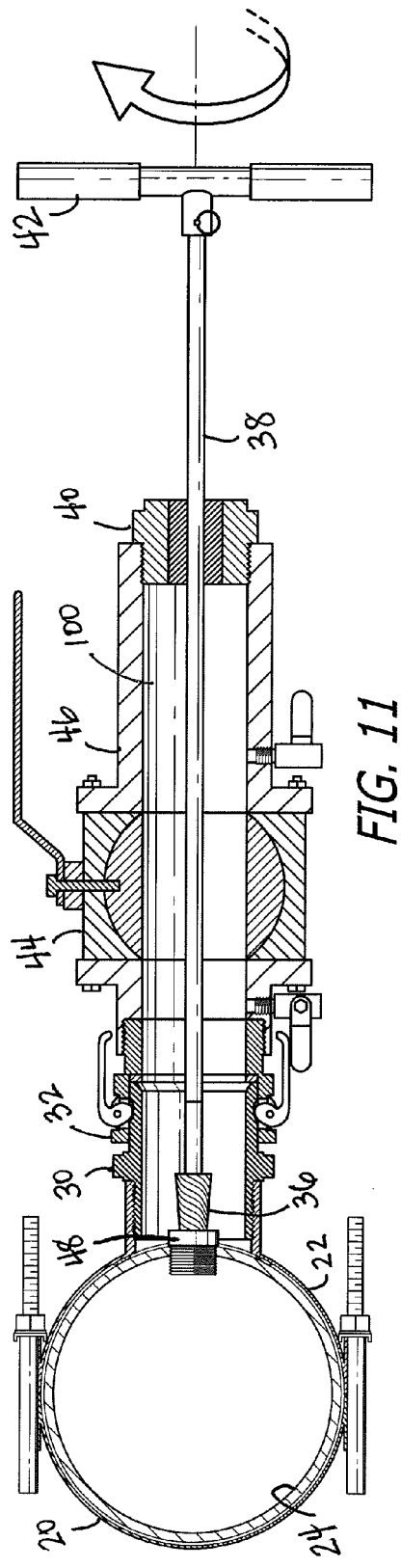
FIG. 10
FIG. 11

VALVE REMOVAL TOOL AND METHOD

CROSS-REFERENCE TO RELATED APPLICATIONS

This application claims the benefit of U.S. Provisional Patent Application No. 61/690,071 filed Jun. 19, 2012.

BACKGROUND OF THE INVENTION

1. Field of the Invention

The present invention relates to the field of removal of brass valves from water mains.

2. Prior Art

Directly tapped valves were and still are a method of drilling into a pressurized pipe to construct a branch line. The apparatus used for this installation was known as a direct tap tapping machine or tapping machine. The machine was connected directly onto the pipe to be tapped and then drilled and threaded. Without removing the machine, the boring bar of the machine was drawn back and the drill/thread die was removed and a corporation valve was connected in its place. The corporation valve was then directly screwed into the threaded opening in the pipe. Over the years, this method of tapping has been reduced and has been replaced by the use of a saddle to encompass the exterior of the pipe and create a seal against the pipe. The corporation valve is then screwed into the saddle. The newer drilling machines now connect to the corporation valves and drill through the valve and eliminate the need for drilling and die threading the pipe first.

Nowadays, various city municipalities and water management agencies are requiring the removal of older directly tapped corporation valves from the water mainline. To accomplish this, the water main must be shut down and partially drained and not under pressure to manually remove the corporation valve from the piping and a "full circle" repair clamp placed over the opening in the pipe to assure a leak proof seal. The water main must then be pressured back up and bacterially re-tested to assure the quality of the water.

Other methods of immediate solutions have been to encapsulate the corporation valve by leaving it screwed into the pipe and with the use of a modified, full circle repair clamp that has been modified with an exterior tubular capsule that fits over the valve. This method isolates the valve inside a protruding sealed apparatus.

BRIEF DESCRIPTION OF THE DRAWINGS

FIGS. 4-11 are cross sectional views illustrating an exemplary sequence of operations in using the tool for removal of a valve and plugging the opening in the pressurized line left by that removal.

DETAILED DESCRIPTION OF THE PREFERRED EMBODIMENTS

Figure 1:
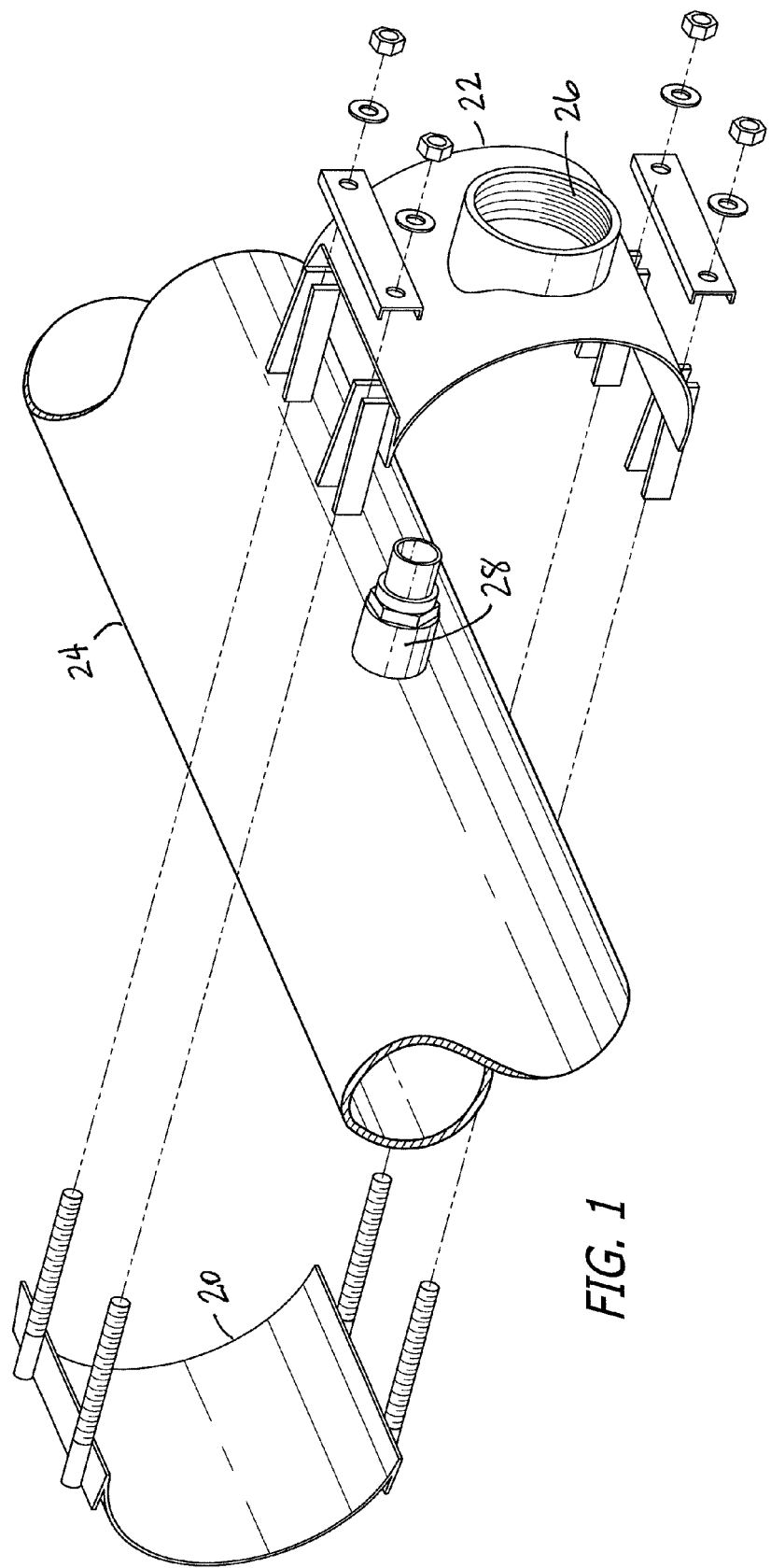
FIG. 1 illustrates a pressurized line, such as a water line with a valve therein to be removed, together with a saddle for placing around the line, shown in an exploded illustration.

The present invention provides for the removal of directly tapped corporation valves/valves from a pipe or water main without shutting down, pressuring down and draining the pipe or water main. In accordance with the invention, a premanufactured full circle "Tee" saddle with inner female threading on the inside portion of the "Tee" is placed over the corporation valve/valve to be removed (FIGS. 1 and 2) wherein saddle members 20 and 22 are clamped around the pressurized line 24 with the internally threaded opening 26 on saddle member 22 being aligned concentric with the corporation valve 28. This can be done sufficiently accurately by eye, though a simple alignment accessory (not shown) may be used to avoid the saddle walking off the desired alignment during its clamping.

Figure 2:
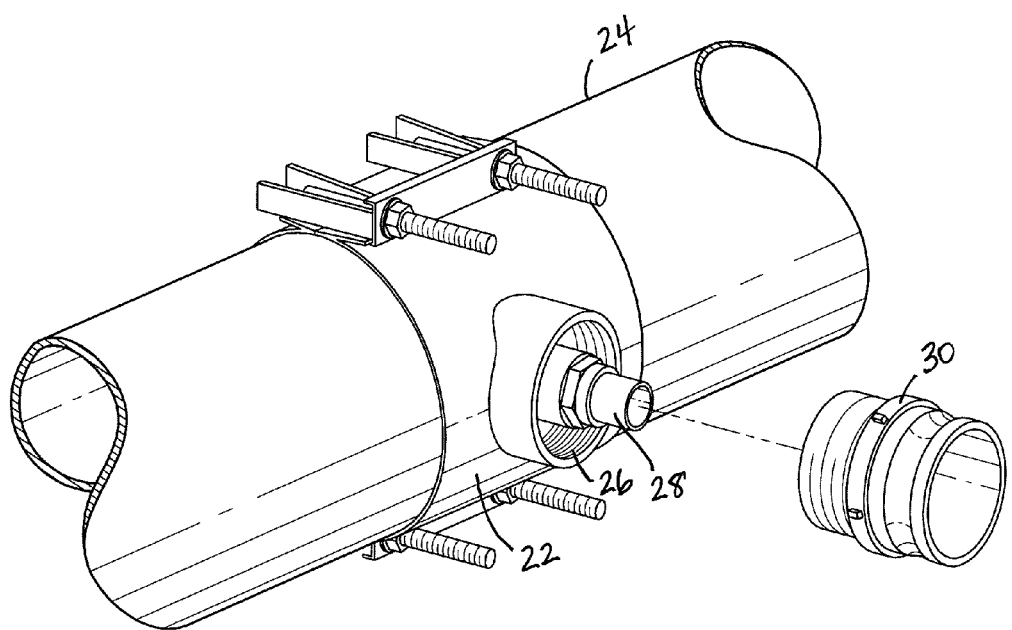
FIG. 2 illustrates the assembly of the saddle of FIG. 1 on the pressurized line.
Figure 3:
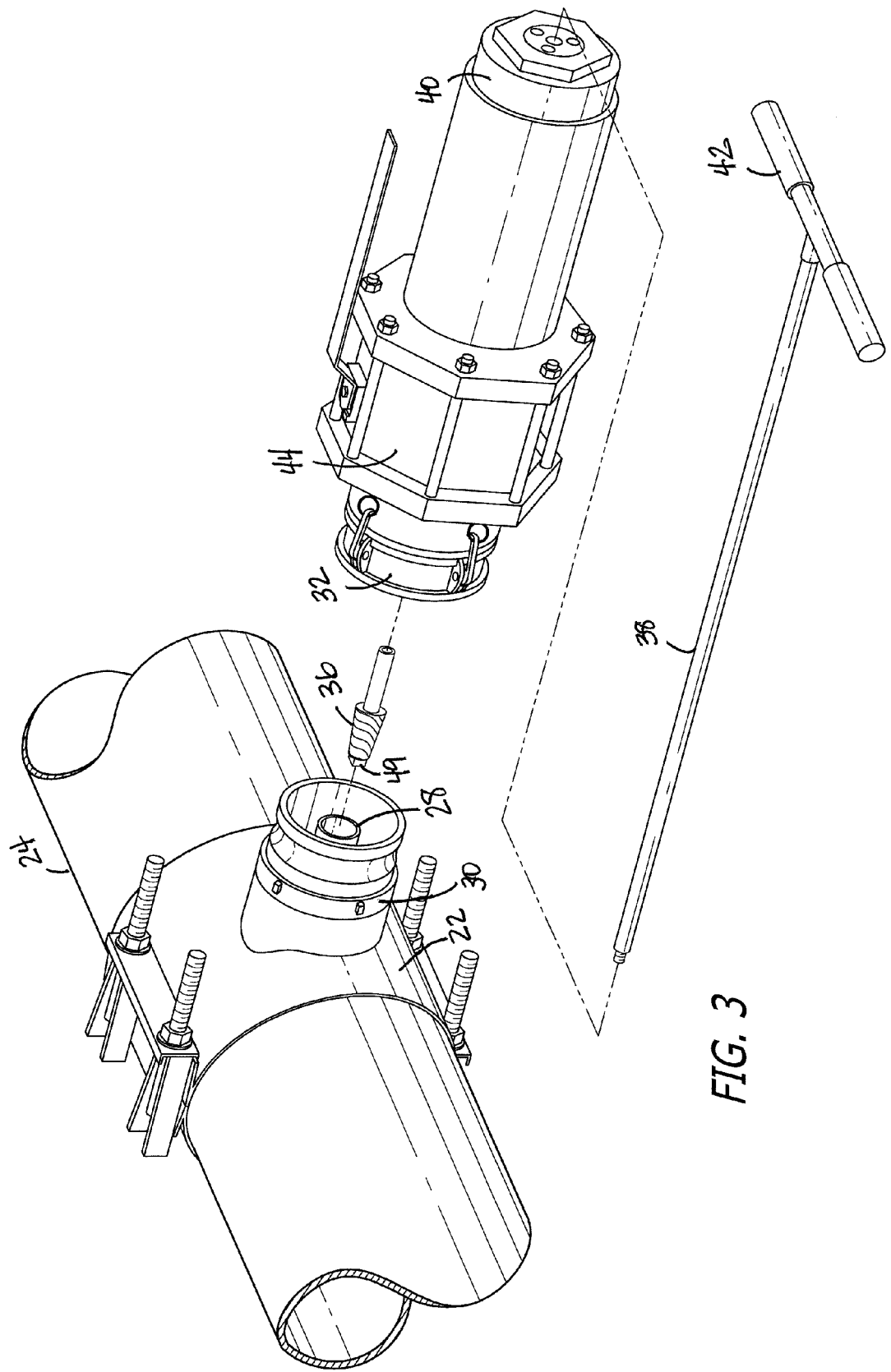
FIG. 3 illustrates the major components of the valve removal tool of the present invention.
Figure 12:
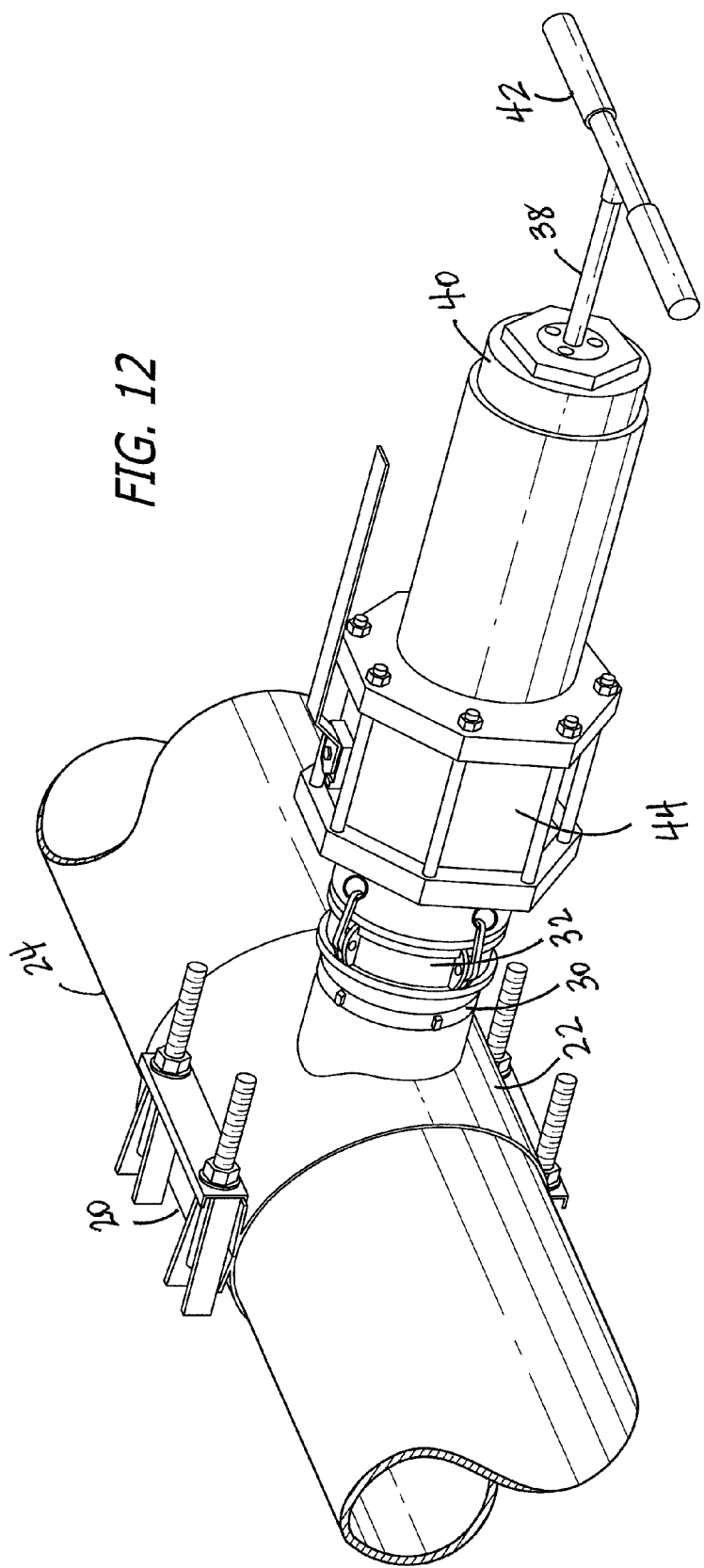
FIG. 12 illustrates the tool ready for disassembly after the plug has been installed.

A male threaded Quick Lock adapter 30 is then threaded into the female threaded portion 26 of the tee saddle member, as shown on FIG. 2.

The inlet side of the tool bearing the female Quick Lock adapter with manual cam locking devices to lock the tool is placed over the male Quick Lock adapter and locked into position (FIGS. 3-12).

The end 40 of the tool is then removed and the shaft portion 38 of the tool is slid through the end 40 and the EZ Out (easy out) tip 36 is screwed onto the shaft portion 38. Then the end 40 is replaced to extend the easy out tip 36 through the body of the tool to insert the easy out tip portion of the shaft 38 into the outlet side of the corporation valve/valve 26 to be removed (FIG. 6). Alternatively, the shaft 38 may be placed in the tool and the easy out tip 36 screwed or otherwise fastened to the shaft 38 before the inlet side of the tool bearing the female Quick Lock 32 is placed over the male Quick Lock adapter 30 and locked into position.

The Tee handle 42 connected to the rear of the shaft is then manually turned in a counter clockwise direction to jam the easy out tip 36 into the outlet of the corporation valve/valve being removed and unscrew the corporation valve/valve from the pipe. This is shown on FIG. 6.

When the corporation valve/valve 28 has become freed from the pipe 24, the shaft 38 is retracted back towards the operator, bringing the corporation valve/valve 28 beyond the sealing mechanism of the inline valve portion 44 of the tool. The inline valve portion 44 of the tool is turned to the closed position to assure a complete isolation from pressurized fluids now escaping from the corporation valve/valve removal (FIG. 7).

The removable back portion 46 of the tool receiving chamber which contains and houses the bushing, seals and the back plate 40 is removed from the tool (FIG. 8) and the corporation valve/valve 28 is removed from the easy out tip 36 of the shaft 38.

A tapered plug 48 or expandable plugging source is then placed on the tip of the shaft 38 (FIG. 9). In one embodiment, the tapered plug 48 is a tapered Teflon plug with threads matching the threads left in the water main or pipe 24 after removal of the corporation valve/valve 28. The back portion or plate 40 of the tool is then reconnected to the receiving chamber 46 of the tool (FIG. 10), creating a seal, and the inline valve portion 44 of the tool is manually turned to the open position, allowing the pressurized fluids to fill the inner portion of the tool. The operator can then push the shaft 38 in a forward direction toward the opening in the pipe 24 and place (screw) the plugging apparatus 48 securely into the opening (FIG. 11). The plug 48 itself has a shaped depression in the face thereof into which a complementarily shaped end 49 of the easy out tip 36 fits to provide a positive drive for securing the plug.

Figure 13:
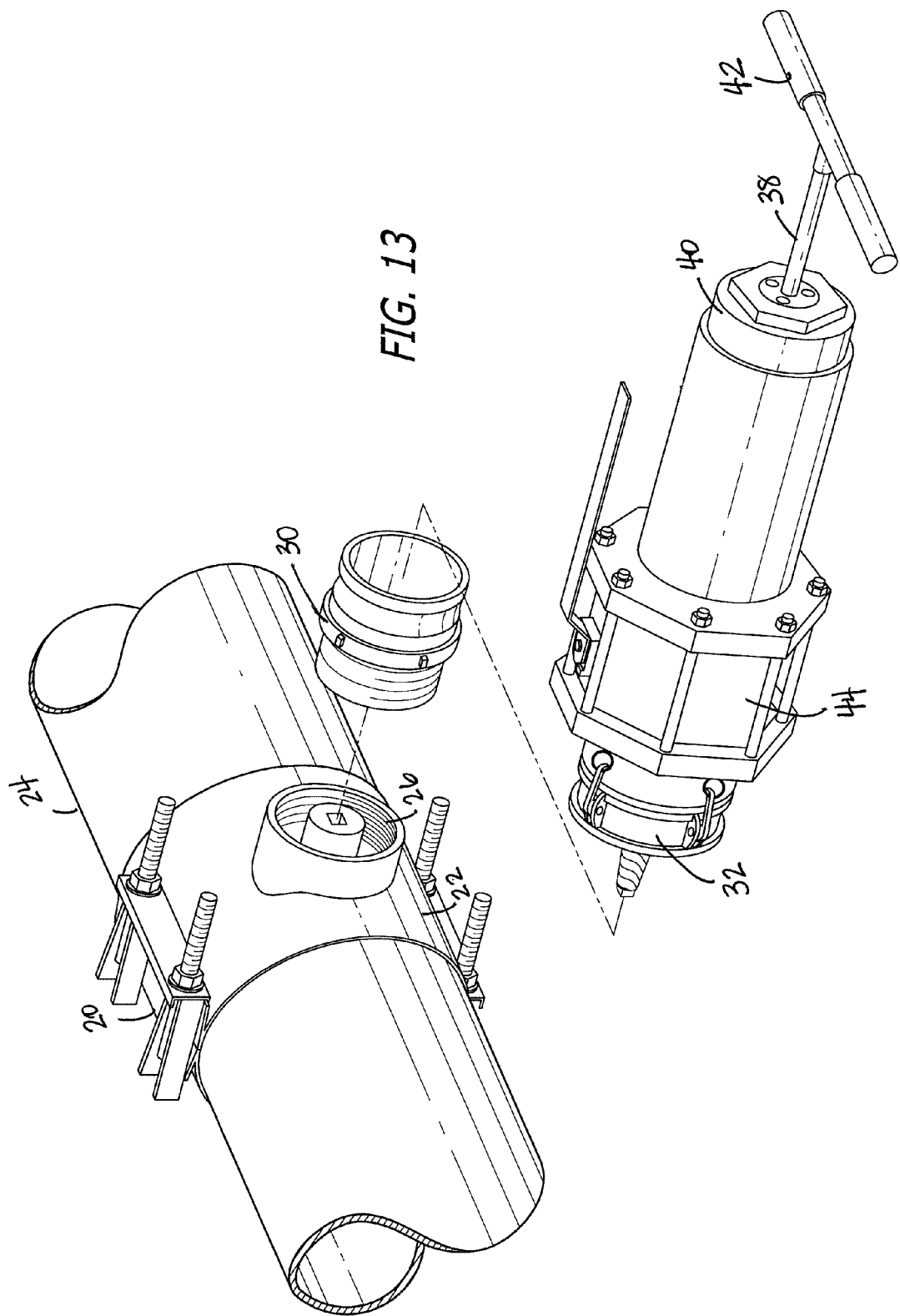
FIG. 13 illustrates disassembly of the tool from the saddle.

When the plugging apparatus is securely in place, the pressure inside the tool can be released and the tool can be removed (FIG. 13).

Figure 14:
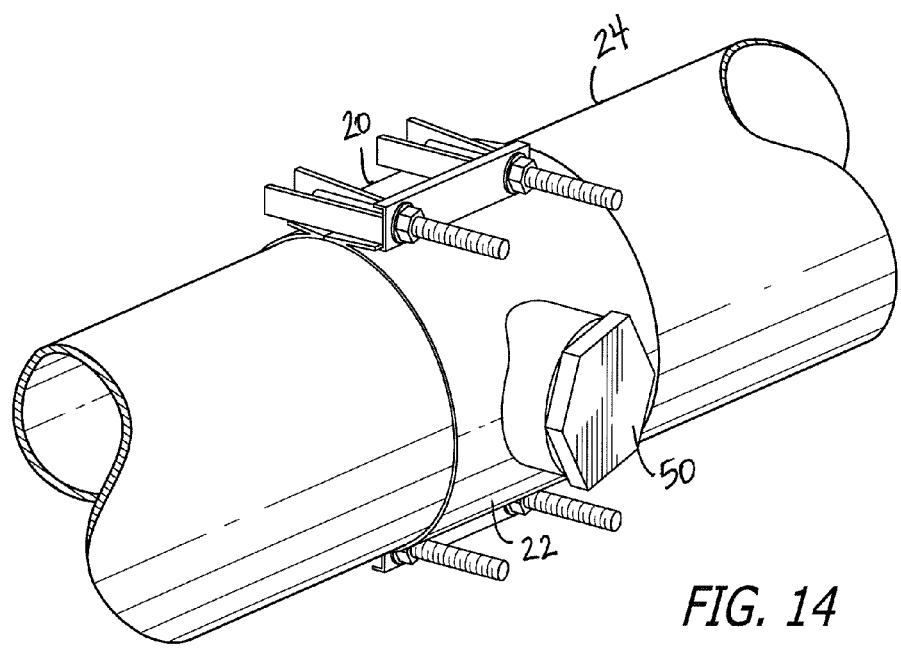
FIG. 14 illustrates the final plugging and sealing of the opening in the saddle.

When the tool has been successfully removed, a male threaded plug 50 of proportional size to the female thread of the "Tee" opening of the saddle can be threaded in and tightened (FIG. 14).

In the embodiment disclosed, the easy out tip 36 screws onto the shaft 38. Since the shaft is turned in one direction to unscrew the valve 28 and turned the other direction to screw in the plug 48, there is a possibility that the easy out tip 36 will inadvertently come off. This does not in practice happen, though the easy out tip 36 may be locked to the shaft, such as by pinning, for example.

Figure 15:
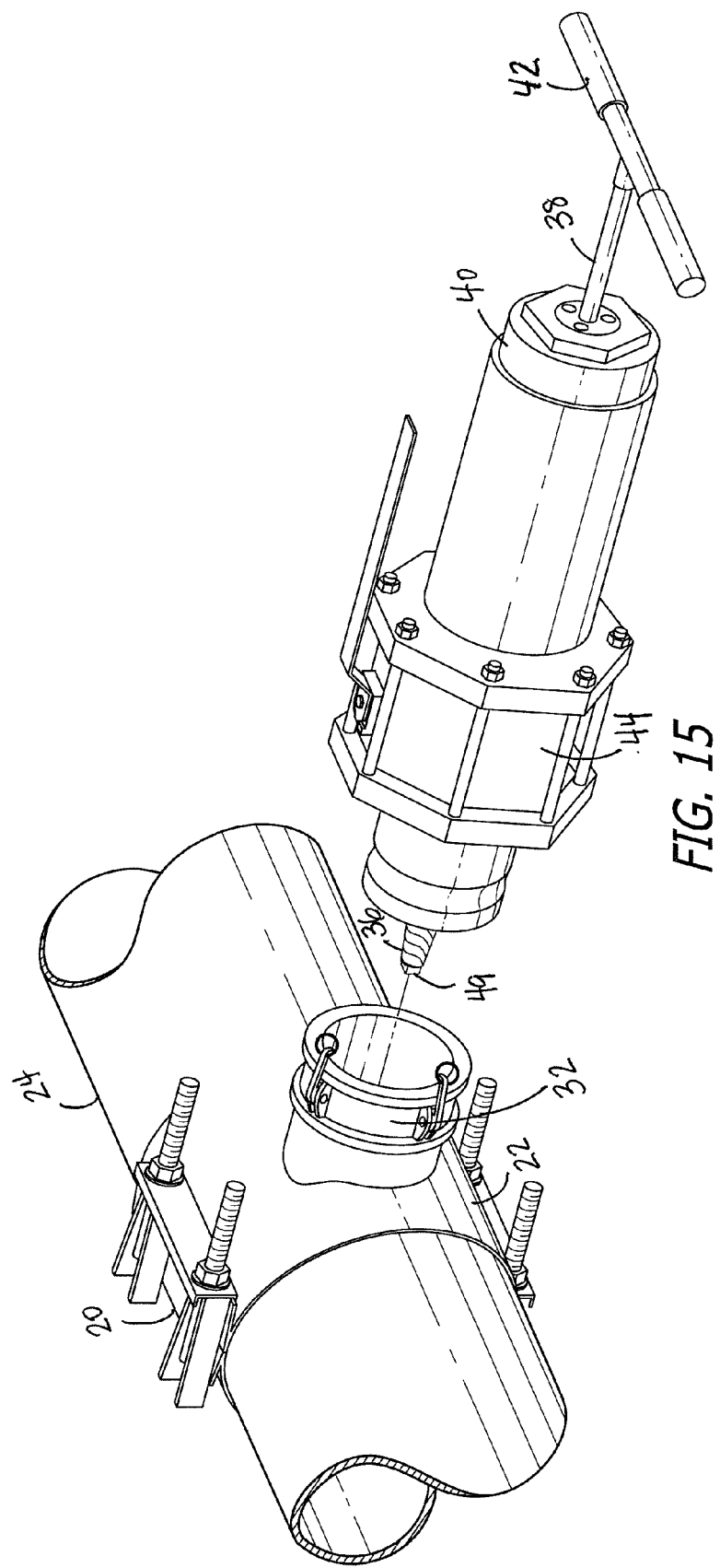
FIG. 15 illustrates an alternate embodiment for the quick lock adapter assembly.

FIG. 15 presents an alternate embodiment. In this embodiment, the male threaded Quick Lock adapter is fastened to the valve 44 and the female threaded Quick Lock adapter is adapted to be screwed into the opening in the saddle. This embodiment eliminates one piece of tool in the design disclosed, though is exemplary of the many variations that may be used in the present invention.

Thus the tool may be characterized as having an aft or receiving chamber 100 (FIG. 7 for example) coupled to a valve 44, preferably a ball valve. The valve 44 is configured to join the opening in the saddle, either directly or through one or more joining members. A quick connect/disconnect fitting for joining the tool to the saddle is desirable, though not a necessity, as the entire tool is perhaps larger than could be easily screwed onto or otherwise fastened to the saddle. The saddle itself is sealed with respect to the pressurize line around the opening in the saddle by a suitable rubber or other seal, preferably but not necessarily supplied already fastened to the saddle (such as by gluing) ready for use.

Typically the valve 28 to be removed and the region around the valve to be removed are cleaned well to assure a good seal by the saddle should the plug 48 initially or ultimately leak. In the case of a pressurized water line, one might also disinfect the region with alcohol or some other disinfectant. Further if desired or required, the volume between the valve 44 and the saddle could be provided with a controlled leak or flow rate out of the chamber to assure that there is a flow out of the pipe 24 rather than some possible circulation back into the pipe 24 to further assure no contamination of the water in the pipe.

As described herein, the phrase easy out (EZ out) is used to generally refer to tool bits used for removal of broken bolts. Such tool bits have a tapered threaded region having threads of an opposite sense (left hand versus right hand) from those of the broken bolt or other threaded member sought to be removed. The threaded region is normally a coarse, somewhat dull threaded region intended to fit into a hole in the member to be removed and when screwed into the hole in the member to be removed, will wedge or jam in the hole, and because threading the easy out into the hole in the member to be removed, will hopefully unscrew the member to be removed because of the opposite sense of the threads on the tool bit. Obviously the size, proportions, sharpness and other parameters of the tool bit may be varied depending on the specific application of the tool bit. Also in some applications such as in the present invention, such parameters may be selected so the tool bit hangs onto (jams or cuts into) the valve being removed until forcibly removed so that the valve does not inadvertently become dislodged and fall off in the forward chamber or ball valve of the tool.

Thus the present invention has a number of aspects, which aspects may be practiced alone or in various combinations or sub-combinations, as desired. While certain preferred embodiments of the present invention have been disclosed and described herein for purposes of illustration and not for purposes of limitation, it will be understood by those skilled in the art that various changes in form and detail may be made therein without departing from the spirit and scope of the invention as defined by the full breadth of the following claims.

What is claimed is:

1. A method of removing a first valve from a pressurized line into which it is threaded comprising:
   providing a saddle with an opening therein;
   providing a male lock adapter, said male lock adapter secured to said saddle;
   providing a lock, said lock placed over said male lock adapter for locking said saddle to said pressurized line;
   providing a tool having an aft chamber having a first end coupled to a first end of a second valve, the aft chamber being closed at a second end by a member having a shaft extending though the member and slideable therein along an axis of the tool, the aft chamber allowing partial disassembly to provide access to a tool bit on an inner end of the shaft;
   the tool bit having a tapered threaded region having threads of an opposite sense from threads on the first valve;
   clamping the saddle around the pressurized line with the opening in the saddle encircling the valve to be removed;
   coupling a second end of the second valve to the saddle;
   with the aft chamber assembled, opening the second valve;
   pushing the shaft toward the first valve inside the pressurized line and turning the shaft to cause the tool bit to cut into and grab the first valve and unscrew the first valve from inside the pressurized line;
   pulling the shaft away from the pressurized line to position the first valve and the tool bit in the aft chamber;
   closing the second valve;
   partially disassembling the aft chamber and removing the first valve from the tool bit;
   coupling a tapered threaded plug to the inner end of the shaft and reassembling the aft chamber;
   opening the second valve and sliding the shaft toward the pressurized line;
   rotating the shaft to screw the tapered plug into an opening in the pressurized line left by the removal of the first valve;
   pulling the shaft away from the pressurized line and removing the tool from the saddle; and
   putting a cap on the opening in the saddle.

2. The method of claim 1 wherein the tapered threaded plug has threads of a pitch equal to a pitch of threads in the pressurized line from which the first valve was removed.

3. The method of claim 1 wherein placing the tapered threaded plug on the inner end of the shaft comprises placing the tapered threaded plug on a mating end of the tool bit.

4. The method of claim 1 wherein the second valve is a ball valve.

5. The method of claim 4 wherein when open, the ball valve, the aft chamber and any fittings coupling the ball valve to the opening in the saddle define a substantially uniform tubular inner diameter.

6. The method of claim 1 wherein when clamping the saddle around the pressurized line with the opening in the saddle encircling the valve to be removed, the saddle seals around the opening in the saddle with respect to the pressurized line.

7. A tool for removing a first valve from a pressurized line into which it is threaded comprising:
- a saddle with an opening therein for clamping to the pressurized line with the first valve accessible through the opening;
- a male lock adapter, said male lock adapter secured to said saddle;
- a lock, said lock placed over said male lock adapter for locking said saddle to said pressurized line;
- the tool having an aft chamber having a first end coupled to a first end of a second valve, the aft chamber being closed at a second end by a member having a shaft extending though the member and slideable therein along an axis of the tool, the aft chamber allowing partial disassembly to provide access to a tool bit on an inner end of the shaft, the second ball valve having a second end coupleable to the opening in the saddle; and
- the tool bit having a tapered threaded region having threads of an opposite sense from threads on the first valve for cutting into and grabbing the first valve and unscrewing the first valve from inside the pressurized line; the tool also being configured to receive a tapered threaded plug on the inner end of the shaft.

8. The tool of claim 7 wherein the tool bit has a shaped end and further comprising a tapered threaded plug with a complimentary shaped face for engagement with the shaped end of the tool bit.

9. The tool of claim 7 wherein the tapered threaded plug has threads of a pitch equal to a pitch of threads in the pressurized line from which the first valve was removed.

10. The tool of claim 7 further comprising a cap for sealing the opening in the saddle.

11. The tool of claim 7 wherein the second valve is a ball valve.

12. The tool of claim 11 wherein when open, the ball valve, the aft chamber and any fittings coupling the ball valve to the opening in the saddle define a substantially uniform tubular inner diameter.

* * * * *